July 13, 1965 A. J. THOMSON ETAL 3,194,940
BALL-ASSEMBLY APPARATUS
Filed Sept. 1, 1961 2 Sheets-Sheet 1
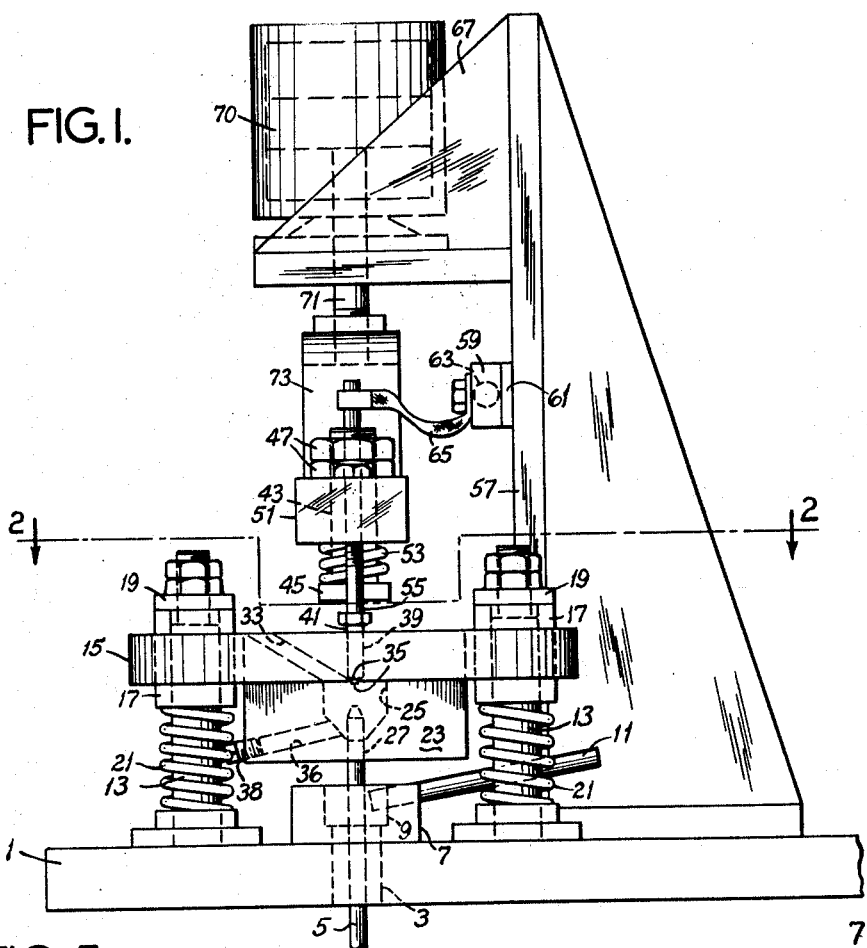
FIG. I.
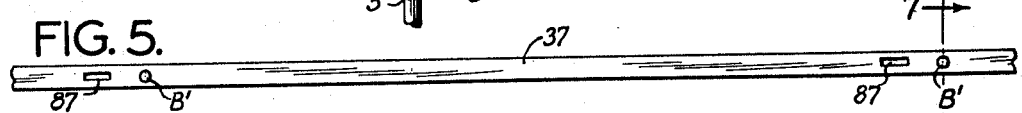
FIG. 5.
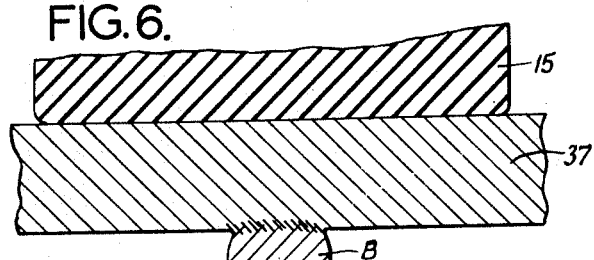
FIG. 6.
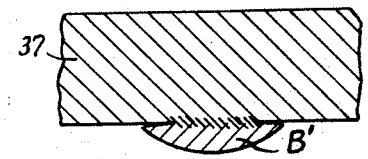
FIG. 7.
Arthur James Thomson,
Gerard R. Achin,
Frank Rynhart,
Inventors.
Koenig, Pope, Senniger and Powers,
Attorneys.

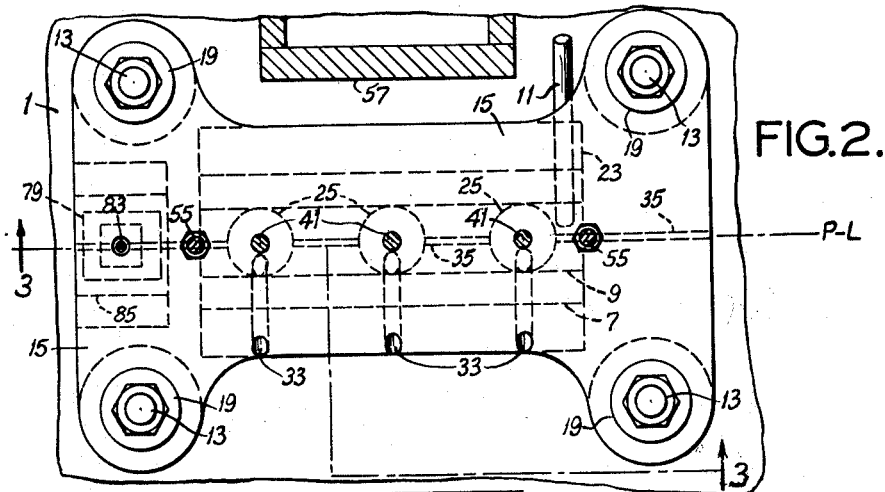
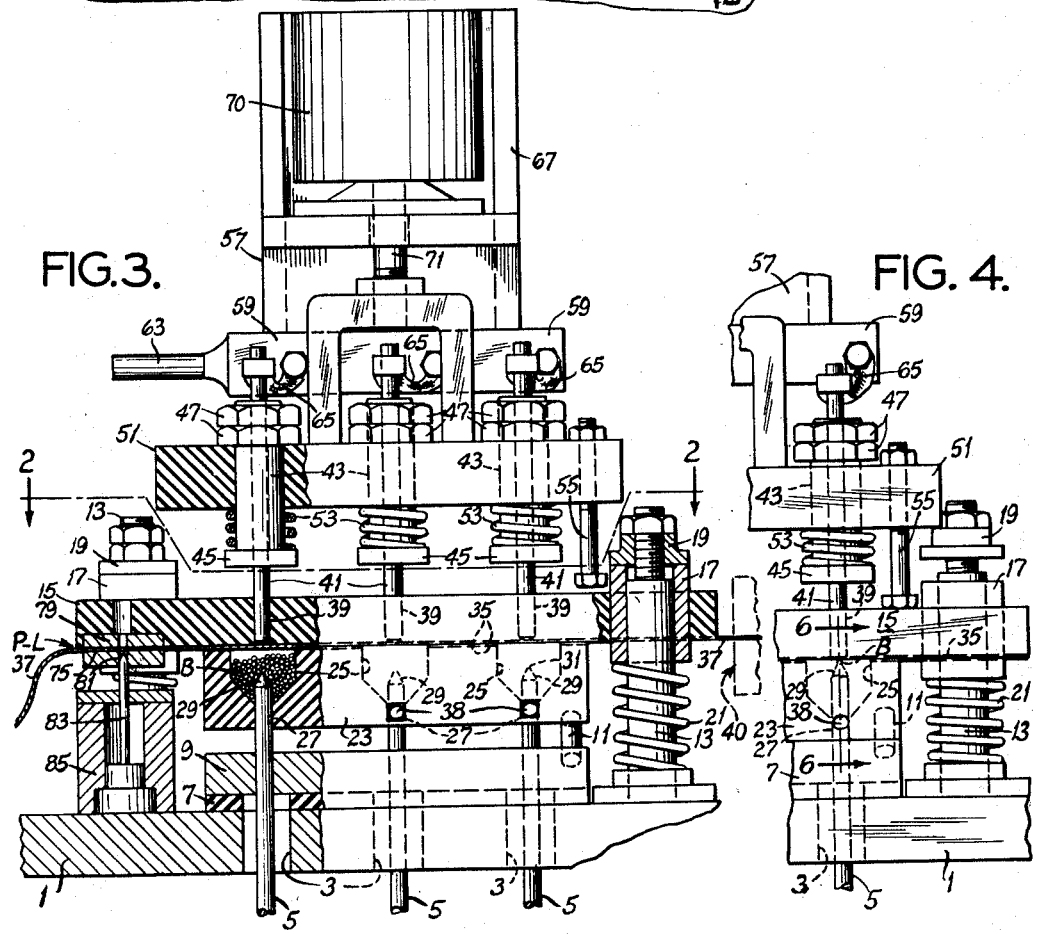

United States Patent Office 3,194,940
Patented July 13, 1965

3,194,940
BALL-ASSEMBLY APPARATUS
Arthur James Thomson, Cranston, R.I., and Gerard R. Achin, North Attleboro, and Frank Rynhart, Taunton, Mass., assignors to Texas Instruments Incorporated, Dallas, Tex., a corporation of Delaware
Filed Sept. 1, 1961, Ser. No. 135,636
10 Claims. (Cl. 219—117)

This invention relates to ball-assembly apparatus, and with regard to certain more specific features, to such apparatus and methods for feeding and locating substantially spherical metal balls for welding or attaching operations to produce electrical contact members.

Among the several objects of the invention may be noted the provision of means and methods for rapidly locating balls on stock to which they are to be attached; the provision of apparatus and methods of the class described for automatically welding metal balls with accurate spacing on metal strip or the like; and the provision of apparatus and methods of this class adapted for rapid automatic production of electrical contact clips and similar devices having relatively small contacts. Other objects and features will be in part apparent and in part pointed out hereinafter.

The invention accordingly comprises the elements and combinations of elements, steps and sequence of steps, features of construction and manipulation, and arrangements of parts which will be exemplified in the constructions and methods hereinafter described, and the scope of which will be indicated in the following claims.

In the accompanying drawings, in which one of various possible embodiments of the invention is illustrated, FIG. 1 is an end elevation of apparatus made according to the invention;

FIG. 2 is a jogged horizontal section taken on line 2—2 of FIGS. 1 and 3;

FIG. 3 is a jogged vertical section taken on line 3—3 of FIG. 2, parts being additionally broken away, certain reciprocating parts being in retracted positions;

FIG. 4 is a fragmentary view of right-hand parts of FIG. 3, showing alternate advanced positions of parts;

FIG. 5 is an enlarged plan view of one form of an intermediate contact strip product that may be made according to the invention;

FIG. 6 is an enlarged fragmentary cross section taken on line 6—6 of FIG. 4; and FIG. 7 is an enlarged cross section taken on line 7—7 of FIG. 5, being enlarged on the scale of FIG. 6.

Corresponding reference characters indicate corresponding parts throughout the several views of the drawings.

The reliable placement and attachment of electrical contacts, such as of gold, silver or the like, to conductive contact members for electrical apparatus, particularly when high accuracies are required in making miniaturized devices generally involves slow, cumbersome and costly operations many times resulting in low yields. This is because of the finicky nature of the operations necessary, particularly when operating with small parts. We have discovered that placements and attachments of this nature can be made rapidly, accurately and economically by welding small balls or spheres of gold, silver or the like on conductive strip material and subsequently performing a coining operation on the welded balls on the strip material to provide a desired finished contact form, e.g. a semilenticular form. By means of the present invention, accurately spaced application of the balls to the strip material is advantageously combined with the desired welding operation in a continuous automated rapid operation providing for economically large yields.

By way of example but without limitation, the case will be considered herein wherein gold spheres or balls of approximately .023 inch in diameter are to be welded to a continuous strip of electrically conductive stock at a predetermined distance apart. The stock is rectangular in section, .020 inch thick and .062 inch wide. The invention is particularly useful for assembling such small-scale parts.

Referring now more particularly to the drawings, there is shown at numeral 1 a fixed bed having openings 3 therein in which are located upwardly extending electrodes 5, composed for example of thoriated tungsten. On the bed 1 is a channel-shaped electrically insulated cradle 7 for holding in position a conductive bus bar 9, through which the electrodes 5 extend and to which they are attached so as to become fixed and to receive current therefrom. At numeral 11 is shown a conductive rod extending from the bus bar 9 for making a connection to a suitable supply of welding current.

Extending up from the bed 1 are four guide posts 13 for guiding a vertically movable guide platen 15 composed of electrically insulating material. Platen 15 carries attached bushings 17 slidable on the posts 13. Adjustable heads 19, engageable by bushings 17, determine the upper limit of the motion of the platen 15. Springs 21 around posts 13 under bushings 17 bias the platen 15 upward to its upper limit.

Attached to and depending from the platen 15 is a ball holder 23, also composed of insulating material. This holder forms three round bowls, sockets or cups 25, having bottoms converging conically to openings 27 through which are slidably accepted the fixed electrodes 5. The diameters of the openings 27 are such that the holder 23 of platen 15 slides or telescopes freely on the electrodes 5 with small clearance. Each electrode is formed at its upper end as a cone 29, terminating in a hemispherical socket 31 adapted to nest a single ball of the size to be welded, such as shown for example at B. A supply of balls such as B is maintained in each bowl 25, being introduced through feed ports 33 extending through the platen 15. Balls may be removed when desired through outlet ports 36 in holder 23. Ports 36 are normally closed by screw caps 38.

The bottom of the platen 15 and the top of the container 23 are shaped to form a slot establishing collinear guide passages 35 of proper cross section for accepting and guiding a strip such as 37. Strip 37 is composed of prepunched conductive clip-forming material of indefinite length (FIG. 5), generally supplied from a reel. The collineating axis of passages 35 diametrically crosses the centers of bowls 25 and establishes a pass line P-L. At these centers are holes 39 in which are relatively slidable electrodes 41. The lower ends of the electrodes 41 are engageable with strip material 37, extending through the passages 35 and across the tops of the bowls 25.

Each electrode 41 extends from a bushing 43 to which it is attached in electrically insulated relationship. Each bushing 43 has a collar 45 at its lower end and an adjustable head 47 on its upper end constituted by threaded lock nuts as shown. Each bushing 43 is slidable in an opening 49 in a reciprocating crosshead 51. Each bushing 43, carrying its respective electrode 41, is biased downward by a spring 53 until its stop head 47 engages the crosshead 51. The cross-head 51 is preferably composed of non-magnetic material. In FIG. 3 it is in its uppermost position.

Extending down from opposite ends of the crosshead 51 are adjustable drive pins 55, the lower ends of which have a small clearance with respect to the platen 15 when the crosshead 51 is retracted upward as far as it will go (see FIGS. 1 and 3). Under these conditions the lower ends of the electrodes 41 in a first position (FIG. 3) are slightly above the top side of a strip 37 located in the passages 35, the amount being slightly less than said clearance.

It will be clear from the above that each movable electrode 41 is coaxial with one of the fixed electrodes 5, so that any contacts between the lower ends of the electrodes 41 and the strip will be centered over an electrode 5.

At numeral 57 is shown a support on base 1. This support carries a bus bar 59, mounted on a block of electrical insulation 61. The bus bar 59 has a terminal 63 for welding current and is connected with each of the electrodes 41 by flexible, braided-wire conductors 65. Extending from support 57 is a bracket 67 in which is a double-acting piston 70, connected with the crosshead 51 through a piston rod 71 and a forked connection 73. Through conventional means, the piston may be pneumatically driven up and down for predetermined distances which establish the upper and lower limits of movement of the crosshead 51.

On one end of the platen 15 (FIG. 3, left side) is located a guide block 79, containing a passage 75 for accepting the strip 37. It also contains a cross passage 81 for registering with a pin holding 83, fixedly supported on the bed 1 by means indicated at 85. The block 79 reciprocates relative to the pin 83 as the platen 15 reciprocates. The strip 37 is provided at intervals with register openings 87 corresponding to the pitch distance desired between locations of contact balls B, to be placed thereon.

To the right of the apparatus (as viewed in FIG. 3) is located a conventional hitch feed device 40 by means of which the strip 37 is intermittently gripped and drawn approximately one pitch distance to the right each time the parts assume the position shown in FIG. 3. This feeding arrangement approximately registers succeeding openings 87 with openings 81. Thereafter, the pin 83 enters the opening so as accurately to register it as the platen 15 descends. At this time the pin 81 functions as locating means for the strip 37.

Operation is as follows, assuming that a prepunched strip 37 has been threaded through members 79, 15 and 23 and approximate registry obtained between one opening 87 and the opening 81, as illustrated in FIG. 3.

Air is admitted above the piston 70 to drive down the crosshead 51. This takes up the clearance between the lower ends of the drive pins 55 and the platen 15. This also compresses springs 53, as the lower ends of the electrodes 41 come from a first separated position (FIG. 3) to a contacting position (FIG. 4) in good electrical contact with the upper surface of the strip 37 extending across cups 25. Then the platen 15, with the ball holder 23, descends, compressing the return springs 21 (see FIG. 4). Pin 83 enters an opening 87. Relative motion occurs between the cups and the lower fixed electrodes 5, which act as lance-type selector plungers. As these lower electrodes in a relative sense plunge up through the mass of balls in the cups, one ball only in each case will position itself in the respective electrode socket 31. This is due to the conical shape of each electrode 5 around its socket. The conical shape also prevents damage to balls as the electrode moves through the mass of the same. Ultimately each ball in a socket 31 will be engaged by that part of the lower side of the strip 37 which is under the lower end of the respective contacting electrode 41. As soon as contact is made between each ball B and the strip 37, the exciting circuit connected across terminals 11 and 63 will be completed and welding current will weld the balls to the strip 37, as schematically illustrated in FIG. 6. Thereafter air is exhausted from above the piston 70 and introduced below it, thus moving the crosshead 51 upward and returning the parts to the FIG. 3 position. Then the hitch feed indexes another pitch length of the strip 37 into proper position across the cups 25 so that the next opening 87 approximately registers with the center line of pin 83. As this approximate registry occurs, the crosshead 51 descends, driving pin 83 into this opening 87, and the operation is repeated. The passages 35 are deep enough to accommodate exit movements of the balls B as the strip to which they are tangentially welded moves out of the apparatus to form a useful intermediate product.

In FIG. 7 is shown how the intermediate product of ribbon form with the balls B accurately welded in place is useful. It is subsequently treated by coining each welded ball, i.e., deforming each ball B by compressing it until it assumes the flattened semilenticular form shown, to form a contact welded to the strip 37. Thereafter the strip 37 is cut up and formed by suitable operations into terminal clips, each one of which has on it a contact such as shown at B′ in FIG. 7.

While three weldments are made at a time by the apparatus illustrated, due to the three-component gang arrangement illustrated, a single weldment may be made at a time (see FIG. 5, for example), or as is obvious any other number desired.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawing shall be interpreted as illustrative and not in a limiting sense.

What is claimed is:

1. Welding apparatus comprising a base, a first electrode extending upward from the base, a reciprocable platen movable between upper and lower limits, said platen comprising a bowl having a first opening through the bottom through which said first electrode extends and adapted to contain a mass of balls covering the inner end of the first electrode when the platen is at its upper limit, said inner end of the first electrode being formed as a socket adapted to contain a single ball, said platen also having a guide passage adapted for movement of a conductive strip across the bowl, said platen also having a second opening communicating with said passage, a second electrode extending through the second opening, reciprocating means adapted to move the second electrode against the strip and to move the platen downward relative to the first electrode a sufficient distance to free the end of said first electrode of all but one ball and to force the strip against the last-named ball, and electric circuit means connected with said electrodes adapted to be completed when a ball and the strip are engaged.

2. Welding apparatus comprising a base, a first plurality of electrodes extending up from the base and arranged on a straight line, a reciprocable platen movable between upper and lower limits, said platen comprising a plurality of bowls arranged on a straight line having a first group of openings through their bottoms through which said first electrodes extend respectively, said bowls being adapted to contain masses of balls covering the inner ends of the first electrodes in the bowls when the platen is at its upper limit, said inner ends of the first electrodes being formed as individual sockets adapted in each case to support a single ball, said platen also having guide passage means extending along a line across the bowls, said guide passage means adapted to receive and guide a movable strip, said platen also having a second group of openings communicating with guide passage means, a second plurality of electrodes extending through the second group of openings respectively, a reciprocating crosshead, means resiliently supporting said second electrodes on the cross head, and lost-motion driving means between said crosshead and said platen adapted upon reciprocation of the crosshead to press the second electrodes resiliently against said strip and thereafter to move the platen downward to engage the strip with any balls supported upon said first electrodes, said electrodes being in a circuit adapted to apply welding current through the balls and the strip upon engagement therebetween.

3. Welding apparatus comprising means supporting a first fixed upright electrode connected in a circuit, the upper end of the electrode forming a socket adapted to nest an individual conductive ball, a guide including an upper stop, an insulating slider on the guide, means biasing said slider toward said stop, said slider forming a bowl for a mass of balls, said bowl having a lower opening slidably accepting the first electrode and having passage means for guiding a movable conductive strip over the bowl, said slider also having an opening above said passage means for the reception of a second electrode coaxial with the first electrode, said second electrode being connected in said circuit, a crosshead supporting the second electrode in electrically insulated relation therewith and adapted to be reciprocated, means biasing the second electrode from the crosshead toward the upper side of the strip, and lost-motion drive means between said crosshead and said slider, whereby upon reciprocation of the crosshead the second electrode is biased into engagement with the upper side of the strip and thereafter the slider is driven downward with the strip toward said end of the first electrode, whereby the latter ascends relatively through any masses of balls in said bowl to extract one for contact with the underside of the strip, the exciting circuit upon contact causing current to flow to weld the balls to the strip.

4. Welding apparatus according to claim 3, including a locator pin, said slider having an opening for accepting said pin upon reciprocation, whereby prepared openings in the strip are adapted to receive said locator pin.

5. Welding apparatus comprising means supporting a first line of fixed upright electrodes connected in a circuit, the upper ends of the electrodes forming sockets adapted to nest individual conductive balls, a guide including an upper stop, an insulating slider on the guide, means biasing said slider toward said stop, said slider forming bowls for masses of the balls, said bowls having lower openings slidably accepting the first electrodes respectively and having passage means for guiding a movable conductive strip over the bowls, said slider also having openings above said passage means for the reception of a second line of electrodes coaxial with the first line of electrodes respectively, said second line of electrodes being connected in said circuit, a crosshead supporting the second line of electrodes in electrically insulated relation therewith and adapted to be reciprocated, means biasing the second line of electrodes from the crosshead toward the upper side of the strip, and lost-motion drive means between said crosshead and said slider, whereby upon reciprocation of the crosshead the second line of electrodes is biased into engagement with the upper side of the strip and thereafter the slider is driven downward with the strip toward said ends of the first line of electrodes, whereby the latter ascend relatively through any masses of balls in said bowls to extract one each for contact with the underside of the strip, the exciting circuit upon contact causing current to flow to weld the balls to the strip.

6. Welding apparatus according to claim 5, wherein the end of each of said first electrodes tapers toward its socket.

7. Welding apparatus according to claim 5, including a locator pin, said slider having an opening for accepting the same upon reciprocation, whereby prepared openings in the strip are adapted to receive said locator pin, and wherein each of said first electrodes tapers toward its socket.

8. Welding apparatus comprising a first electrode, a support therefor, a bowl member, said electrode and bowl member having first and second positions relative to one another, said bowl member having an opening through its bottom and through which said first electrode extends, said bowl member adapted to contain a mass of ball-like objects covering the inner end of the first electrode when the bowl member and electrode are in their first relative positions, said inner end of the first electrode being formed as a socket adapted to contain a single ball-like object, said bowl member also having a guide passage adapted for movement of an elongate conductor across the bowl member, a second electrode, said second electrode and said conductor having relatively separated and contacting positions, reciprocating means for placing the second electrode and the conductor in contacting relationship and then placing the bowl member and the first electrode in their second relative positions to free the end of said first electrode of all but one ball-like object and to engage the last-named ball-like object and the conductor, and electric circuit means connected with said electrodes adapted to be completed when a ball-like object and the strip are engaged.

9. Welding apparatus according to claim 8, wherein the conductor is provided at intervals with registration means, said support carrying registering means engageable with said registration means when the bowl member and the first electrode are in their said second relative positions.

10. Welding apparatus comprising a fixed first lower electrode, an upper platen, said platen comprising a bowl having a bottom opening through which said first electrode extends and which is adapted to contain a mass of balls covering the inner end of the first electrode when the platen is in an elevated position, means biasing the platen upward to a first position, said inner end of the first electrode being formed as a socket adapted to contain a single ball, said platen also having a guide passage adapted for movement of a conductive strip across the bowl, a reciprocable member above the platen, driving means for said reciprocable member, a second electrode carried by the reciprocable member and spring-biased downwardly therefrom a limited distance toward the strip in said passage and positioned to make resilient contact therewith upon reciprocation, extension means on the reciprocable means for contacting and moving the platen after the second electrode under reciprocation resiliently contacts the strip, said extension means driving down the platen relative to the first electrode a sufficient distance to free the end of said first electrode of all but one ball and thereafter forcing together the last-named ball and one side of the strip where the latter is resiliently contacted on its other side by the second electrode, and electric circuit means connected with said electrodes adapted to be completed when a ball and the strip are engaged.

References Cited by the Examiner

UNITED STATES PATENTS

| | | | |
|---|---|---|---|
| 1,665,762 | 4/28 | Waream | 219—117 X |
| 2,033,311 | 3/36 | Stresau | 219—137 |
| 2,079,265 | 5/37 | Trainer | 219—137 |
| 2,154,243 | 4/39 | Langhans | 219—103 |
| 2,339,884 | 1/44 | Schlumpf | 219—103 X |
| 2,874,454 | 2/54 | Gullett | 29—194 |
| 2,905,802 | 9/59 | Roeber | 219—79 |
| 2,905,803 | 9/59 | Brady | 219—79 |
| 2,956,651 | 10/60 | Allred | 29—194 X |
| 3,017,689 | 1/62 | Link | 29—194 |

RICHARD M. WOOD, *Primary Examiner.*

HARRY BIZOT, *Examiner.*

UNITED STATES PATENT OFFICE
CERTIFICATE OF CORRECTION

Patent No. 3,194,940                          July 13, 1

Arthur James Thomson et al.

It is hereby certified that error appears in the above numbered patent requiring correction and that the said Letters Patent should read as corrected below.

In the grant (only), line 2, for "Frank Pynhart" read -- Frank Rynhart --; column 3, line 23, for "pin holding" read -- holding pin --.

Signed and sealed this 18th day of January 1966.

(SEAL)
Attest:

ERNEST W. SWIDER
Attesting Officer

EDWARD J. BRENNER
                                               Commissioner of Patents